Aug. 4, 1931.  W. HALL  1,817,190
JACKING DEVICE FOR ROAD VEHICLES
Filed June 4, 1927
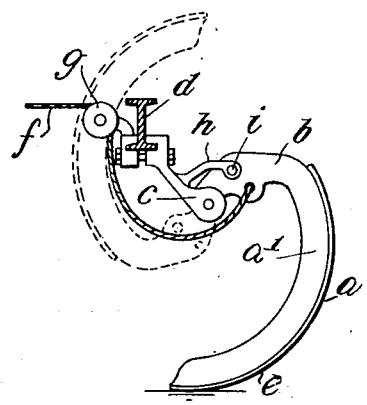
WITNESSES.
A. S. Mickhin
K. Welsh.
INVENTOR
William Hall
per George Hughes
ATTORNEY Patented Aug. 4, 1931

1,817,190

UNITED STATES PATENT OFFICE

WILLIAM HALL, OF HEATON, BOLTON, ENGLAND

JACKING DEVICE FOR ROAD VEHICLES

Application filed June 4, 1927, Serial No. 196,578, and in Great Britain January 8, 1927.

This invention relates to devices for raising motor road vehicle axles and for like purposes, where it is desired to raise the vehicle body in a simple and expeditious manner, for instance, for removing or repairing wheels, and for other purposes.

The object of my invention is to provide a simple device in the form of an arcuate bar like lifting member for engaging the road to effect lifting of a wheel, and an embodiment of this invention is shown in side elevation in the annexed drawing.

In the drawing a device is shown for use with front wheels and if desired when possible for the rear wheels. An arcuate bar $a$ preferably formed a web $a'$ is provided cranked or curved inwards, as at $b$ at the end where it is pivotally connected to a bracket $c$ secured to the front axle bar $d$. The free end of this bar $a$ is also curved inwards as at $e$ to provide a road engaging part for raising a front wheel off the ground. Normally this member which is substantially C shaped is maintained clear of the ground by the tension of a cable $f$ connected to a suitable control lever and passed over a guide $g$. The bracket $c$ is formed with an apertured projection $h$ adapted to receive a pin $i$ passed through the projection $h$ and a hole in the bar $a$ to hold the bar $a$ in the jacking position when desired. In practice it is only necessary to lower this device into engagement with the ground and at the same time to move the vehicle slightly rearwards until the end $e$ engages the ground with a consequent raising of the wheel when the vehicle brakes are applied. The road engaging surface of the member $a$ is preferably edged with rubber or can be roughened.

A jacking device is provided adjacent each wheel, and if desired a pair of jacking devices can operate in unison.

What I claim is:—

In a jacking device for motor road vehicles, a bracket provided with means for readily attaching it to a motor vehicle wheel axle, an arm in the form of a single length of metal bent to arcuate form and having an outer road engaging face, an integral web on the inner face of said arm, a cranked extension at one end of said web extending away from the inner face of said arm towards said bracket, a pivotal connection between the outer end of said cranked extension and said bracket beneath and to one side of the axle, the road engaging portion when said arm is swung to an operative position being beneath said pivotal connection to the bracket and when said arm is swung from such position through substantially a semi-circle to an inoperative position said portion being above the said pivotal connection close to the said axle, and means for relatively immovably connecting the said cranked extension to said bracket when the jacking device is in the operative position.

In witness hereof I have signed this specification.

WILLIAM HALL.